US012435702B2

(12) United States Patent
Cerda Varela et al.

(10) Patent No.: US 12,435,702 B2
(45) Date of Patent: Oct. 7, 2025

(54) WIND TURBINE

(71) Applicant: Siemens Gamesa Renewable Energy A/S, Brande (DK)

(72) Inventors: Alejandro Cerda Varela, Copenhagen East (DK); Niels Karl Frydendal, Herning (DK); Kim Thomsen, Skørping (DK); Morten Thorhauge, Ry (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 424 days.

(21) Appl. No.: 17/919,976

(22) PCT Filed: Apr. 27, 2021

(86) PCT No.: PCT/EP2021/060928
§ 371 (c)(1),
(2) Date: Oct. 19, 2022

(87) PCT Pub. No.: WO2021/219601
PCT Pub. Date: Nov. 4, 2021

(65) Prior Publication Data
US 2023/0167853 A1     Jun. 1, 2023

(30) Foreign Application Priority Data

Apr. 28, 2020    (EP) .................................... 20171727

(51) Int. Cl.
*F03D 80/70* (2016.01)
*F16C 17/10* (2006.01)
(Continued)

(52) U.S. Cl.
CPC .............. *F03D 80/70* (2016.05); *F16C 17/10* (2013.01); *F16C 33/1025* (2013.01);
(Continued)

(58) Field of Classification Search
None
See application file for complete search history.

(56) References Cited

U.S. PATENT DOCUMENTS 8,690,540 B2 *   4/2014   Eriksen .................. F16C 19/38
                                                   416/174
9,903,345 B2 *   2/2018   Pasteuning ......... F16C 33/6659
                         (Continued)

FOREIGN PATENT DOCUMENTS

CN          101963188 A      2/2011
CN          103635707 A      3/2014
                         (Continued)

OTHER PUBLICATIONS

PCT International Search Report and Written Opinion of International Searching Authority mailed May 26, 2021 corresponding to PCT International Application No. PCT/EP2021/060928 filed Apr. 27, 2021.

*Primary Examiner* — Juan G Flores
(74) *Attorney, Agent, or Firm* — Schmeiser, Olsen & Watts, LLP (57) ABSTRACT

A wind turbine includes a nacelle with a main bearing tilted with its rotation axis towards the horizontal axis and including an inner and outer ring, wherein the main bearing is a slide bearing and the inner ring is stationary while the outer ring rotates, with the main bearing being lubricated, and with the outer ring including a first and a second sealing means, wherein the first sealing means is due to the tilt of the main bearing lower than the second sealing means, wherein a stationary leakage lubrication fluid collection means is provided adapted for collecting lubrication fluid, wherein the outer ring is provided with one or more axial bores connecting a leakage lubrication fluid collection area to the leakage lubrication fluid collection means and wherein each (Continued)

sealing means includes a groove accommodating a sealing element and a sealing element carrier ring.

13 Claims, 5 Drawing Sheets (51) Int. Cl.
 *F16C 33/10* (2006.01)
 *F16C 33/74* (2006.01)
(52) U.S. Cl.
 CPC .......... *F16C 33/106* (2013.01); *F16C 33/108* (2013.01); *F16C 33/1085* (2013.01); *F16C 33/74* (2013.01); *F05B 2240/50* (2013.01); *F05B 2240/57* (2013.01); *F05B 2260/98* (2013.01); *F16C 2360/31* (2013.01)

(56) References Cited

U.S. PATENT DOCUMENTS

| | | | |
|---|---|---|---|
| 10,072,704 B2* | 9/2018 | Sato | F03D 80/70 |
| 12,110,874 B2* | 10/2024 | Hoelzl | F16C 33/74 |
| 2011/0243741 A1* | 10/2011 | Eriksen | F16C 33/6666 |
| | | | 416/174 |
| 2013/0280039 A1* | 10/2013 | Pasteuning | F16N 7/40 |
| | | | 184/6 |
| 2014/0029882 A1 | 1/2014 | Palmer et al. | |
| 2015/0017000 A1* | 1/2015 | Sato | F16C 17/10 |
| | | | 416/174 |
| 2015/0330452 A1 | 11/2015 | Mongeau | |
| 2022/0010784 A1* | 1/2022 | Hoelzl | F16C 33/74 |

FOREIGN PATENT DOCUMENTS

| | | |
|---|---|---|
| CN | 107448481 A | 12/2017 |
| CN | 110173400 A | 8/2019 |
| EP | 2754893 A1 | 7/2014 |
| JP | H0979272 A | 3/1997 |
| JP | 2004346972 A | 12/2004 |

* cited by examiner

WIND TURBINE

CROSS-REFERENCE TO RELATED APPLICATIONS

This application claims priority to PCT Application No. PCT/EP2021/060928, having a filing date of Apr. 27, 2021, which claims priority to EP Application No. 20171727.9, having a filing date of Apr. 28, 2020, the entire contents both of which are hereby incorporated by reference.

FIELD OF TECHNOLOGY

The following relates to a wind turbine comprising a nacelle with at least one main bearing tilted with its rotation axis towards the horizontal axis and comprising an inner ring and an outer ring.

BACKGROUND

A wind turbine usually comprises a tower with a nacelle at its top. A rotor is arranged at the nacelle, which rotor comprises a hub, to which one or more rotor blades, usually three rotor blades, are fixed interacting with the wind. The rotation of the hub respectively the rotor runs an electric generator. The rotor is arranged in at least one main bearing, which comprises an inner ring, which is usually stationary, and an outer ring, which is connected to the rotor and which rotates relative to the inner ring. It is though also known, especially in relation to geared wind turbines, to have the rotor connected to the inner ring of the main bearing and where the outer ring is stationary. Traditionally wind turbines use a roller bearing as a main bearing but new and large multi Megawatt wind turbines may find it beneficial to use a slide bearing as a main bearing. A slide bearing needs a liquid lubrication and a good sealing to avoid leakage, which nevertheless still occurs.

SUMMARY

An aspect relates to providing a wind turbine with an improved lubrication.

Embodiments of the invention propose a wind turbine comprising a nacelle with at least one main bearing tilted with its rotation axis towards the horizontal axis and comprising an inner ring and an outer ring, wherein the main bearing is a slide bearing and the inner ring is stationary while the outer ring rotates around the inner ring, with the main bearing being lubricated with a lubrication fluid, and with the outer ring comprising a first and a second sealing means arranged at both sides of the outer ring for sealing to the inner ring and extending around the outer ring, wherein the first sealing means is due to the tilt of the main bearing lower than the second sealing means, wherein a stationary leakage lubrication fluid collection means is provided adjacent to the first sealing means adapted for collecting lubrication fluid leaking from the first and the second sealing means, wherein the outer ring is provided with one or more axial bores connecting a leakage lubrication fluid collection area adjacent to the second sealing means to the leakage lubrication fluid collection means and wherein each sealing means comprises a groove accommodating a sealing element and a sealing element carrier ring having a fold and a clamp ring attached to the carrier ring closing the fold to build the groove and clamping the sealing means in the groove.

Embodiments of the invention propose a wind turbine with a lubrication system using a lubrication fluid, for example, oil, for lubricating the main bearing, which is a slide bearing, and with the possibility to collect any leakage and to return the leakage back to the lubrication circuit. This is possible, as the rotating outer ring, which in embodiments may be a one-piece-ring made of one single part, is provided with a first and a second sealing means, which are arranged on both sides of the outer rotating ring extending around the whole circumference of the outer ring. The sealing means are arranged to provide a good sealing towards the stationary inner ring. Nevertheless some leakage may occur. This leakage is collected. For collecting the leakage a stationary leakage lubrication fluid collection means is provided adjacent to the first sealing means. This stationary lubrication fluid collection means is adapted to collect the lubrication fluid leaking through both sealings. As the first sealing means is adjacent to the stationary lubrication fluid collection means, this leakage amount can easily be collected. As mentioned, a second sealing means is arranged on the other side of the outer ring. For collecting any leakage a leakage lubrication fluid collection area is provided adjacent to this second sealing means, which leakage lubrication collection area may be provided as rotating with the outer ring respectively the second sealing means in some embodiments. So any lubrication fluid leaking through the second sealing means will be collected in this leakage lubrication fluid collection area.

For transferring the collected leakage fluid the outer ring is provided with one or more axial bores acting as rotating channels, which bores connect the leakage lubrication fluid collection area to the leakage lubrication fluid collection means arranged at the other bearing side, so that the leakage fluid can flow from one side of the bearing to the other side of the bearing. This flow is promoted by the fact that the main bearing and thus the rotor etc. is slightly tilted towards the horizontal axis. The tilt angle usually is about 5-10°. Due to the slight tilt of the main bearing one side of the bearing is lower than the other side of the bearing. According to embodiments of the invention the first bearing side, to which the first sealing means is arranged, is the lower bearing side, while the opposite second bearing side, to which the second sealing means is arranged, is the higher bearing side. As also the rings are tilted, and as the bore or the bores provided in the rotating outer ring connecting the leakage lubrication fluid collecting area with the leakage fluid lubrication fluid collecting means are parallel to the axis of rotation of the bearing, also the one or the several axial bores are tilted, so that there is a permanent incline from the leakage lubrication fluid collection area to the leakage lubrication fluid collection means, which incline promotes the flow of the leakage fluid from the collection area to the collection means.

Embodiments of the invention advantageously allow to use a lubrication fluid for lubricating a slide bearing. As it is a fluid, it allows for lubrication of all contact points during operation, all surfaces are wetted by the lubrication fluid and are therefore corrosion protected during operation and even during standstill, even a long standstill. Due to its fluid character it is possible to circulate the lubrication fluid in a lubrication circuit by means of at least one pump allowing to transport the lubrication fluid to any points of need, so that it is easily possible to supply the lubrication fluid to distinct points of the main bearing, where a good lubrication is necessary, from where the lubrication fluid then distributes within the whole main bearing.

While the wind turbine, which may be a direct drive wind turbine with a single bearing or a gear wind turbine, may comprise only one single main bearing, the wind turbine may also comprise a two-bearing system with the outer ring rotating around the stationary inner ring. The inventive leakage fluid collection and distribution system also allows for an excellent lubrication of the two-bearing system, which is a double slide bearing system.

As mentioned, a rotating leakage lubrication fluid collection area is provided at the rotating outer ring respectively the outer ring system. In embodiments, this leakage lubrication fluid collection area may be a collection groove extending around the outer ring, so that any leakage fluid leaking at any point at the circumference of the outer ring respectively the second sealing means can be collected in the circular groove. The leakage fluid usually collects at the low side of the rotating groove respectively at the lowest point, as it is fluid and as the rotational speed is not very high. Even if only one axial bore or channel with a certain diameter is provided, this rotating bore passes through the leakage fluid sump and takes some leakage fluid which flows to the other bearing side. In an embodiment, several bores connecting the leakage lubrication fluid collection area with the leakage fluid connection means may be provided, which bores may be equally distributed around the circumference of the outer ring. This ensures that the leakage fluid is transported from one bearing side to the other side almost all the time, as there is a number of connection bores rotating through the leakage fluid sump, into which bores the fluid can flow. As these several bores may be equally distributed, there is almost a constant fluid flow.

As mentioned, the collected lubrication fluid leaking from both the first and the second sealing means is collected in a collection means arranged stationary adjacent to the first sealing means. In embodiments, this leakage lubrication fluid collection means may be arranged at the stationary inner ring, which is very close to the outer ring respectively the first sealing means, so that any fluid leaking from the first sealing means can almost directly be collected in the collection means. In embodiments, this collection means may be a collector ring extending around the main bearing, which ring as mentioned may be arranged at the stationary inner ring. In an alternative embodiment it may also be fixed to any other stationary support means, as long it is adjacent respectively very close to the first sealing means. The collector ring allows the collection of the leakage fluid not only at the lowest point of the circumference but also along the whole 360° rotation of the outer ring during which some leakage fluid max exit especially the bores.

A drip edge ring may be arranged at the outer ring extending to or into the leakage lubrication fluid collection means, especially the collector ring. This drip edge ring bridges any axial distance between the first sealing means and the collection means respectively the collector ring, so that no leakage fluid can flow anywhere else than into the collector ring. It drips from the drip edge of the drip edge ring into the collection means respectively the collector ring, which may have a certain collection groove or the like.

Each sealing means is adapted to provide a proper sealing between the rotating outer ring, to which it is fixed, and the stationary inner ring. In embodiments, each sealing means may comprise a groove accommodating a sealing element, which is for example a lip seal element having one or more lips extending from a sealing element basis towards the inner ring, along which the sealing element respectively the sealing lip(s) slide. This sealing element is accommodated in a groove of the sealing means, so that it is easy to be arranged at the sealing means respectively installed.

Each sealing means comprises a sealing element carrier ring having a fold and a clamp ring attached to the carrier ring closing the fold to build the groove and clamping the sealing means in the groove. Each sealing means therefore consists of two parts, i.e. the sealing element carrier with the fold and a clamp ring closing the fold to build the groove. The width of the sealing element is a little bit larger than the width of the groove, so that the sealing means is clamped when the groove is closed.

As already mentioned, in embodiments, the leakage lubrication fluid area may be as close as possible to the second sealing means and may be realised as a collection groove extending around the circumference of the outer ring. In an exemplary embodiment the clamp ring of the second sealing means comprises the leakage lubrication fluid area, especially the collection groove. The collection area respectively the collection groove is integrated in the second sealing means comprising the sealing element carrier and the clamp ring. It is directly integrated in the clamp ring, so that any leakage fluid leaking from the very close sealing element can directly be collected in the collection groove.

For avoiding any collected leakage fluid again leaking from the leakage lubrication fluid collection area respectively the collection groove, a sealing element like a sealing lip is arranged at the clamp ring sealing the collection groove to the inner ring. This sealing lip seals the collection groove on the other side of the groove, so that any leakage fluid collected in the groove remains in the groove until it is guided away via the axial bores to the leakage fluid collection means on the other side of the main bearing.

As mentioned above, in embodiments the sealing means may comprise the sealing element carrier and the clamp ring, closed to which respectively integrated into which the leakage lubrication fluid collection area is realised for example, in form of the groove in embodiments. According to another embodiment of the invention the at least one axial bore respectively each axial bore communicates with the leakage lubrication fluid collection area, especially the groove, and extends from the clamp ring through the sealing element carrier ring of the second sealing means, the outer ring and through the sealing element carrier and the clamp ring of the first sealing means and is open to the leakage lubrication fluid collection means. Each axial bore which connects the leakage lubrication fluid collection area with the leakage lubrication fluid collection means comprises several bore sections, which together realise the complete axial bore connecting the collection area to the connection means. The bore sections are realised in the clamp ring and the carrier ring of the second sealing means, in the outer ring and in the element carrier and the clamp ring of the first sealing means. The or each axial bore is open on both ends. On the side of the second sealing means it is open to the collection area respectively the collection groove, and on the side of the first sealing means it is open to the collection means respectively the collector ring. As all respective bore sections are realised on the same radius of all ring components, it is only necessary to adjust the separate parts and to align the bore sections, so that the respective axial bore is realised. Especially when the axial bores are equally distanced around the circumference the alignment is simple.

In embodiments, the clamp ring and the element carrier ring may be fixed to the outer ring by means of several bolt connections, which may be equally distributed around the circumference of the outer ring. Also the fixation of the respective parts is realised with equally distanced bolt connections. For example a bolt connection follows each axial bore or the like. Nevertheless the spacing may also be different. In this circumstance it is also possible to fix the sealing element carrier with first bolt connections to the side of the outer ring and the clamp ring with the second bolt connections either to the sealing element carrier or also to the outer ring side.

As each sealing means is a two-piece device sealing or collecting a fluid in some embodiments at least one sealing ring may be arranged each between the clamp ring and the element carrier ring and the element carrier ring and the outer ring, which sealing rings may be arranged in respective grooves. With these sealing rings a radial tight connection of the clamp ring to the element carrier ring and of the element carrier ring to the outer ring is realised. It is possible to provide the groove in only one of the adjacent pieces, or it is also possible that both are provided with respective parts which complement to the final groove.

As already mentioned, in embodiments the inventive main bearing may be automatically lubricated. For realising such an automatic lubrication, in embodiments the wind turbine may comprise an automatic lubrication arrangement with a lubrication circuit with a pump for circulating the lubrication fluid, to which lubrication circuit the leakage lubrication fluid collection means, especially the collector ring is connected. This lubrication arrangement allows for automatically providing the lubrication fluid to the points of need at or in the one or two main bearings, i.e. one or two slide bearings. As the leakage lubrication fluid collection means, especially the collector ring is connected to the lubrication circuit, also any leakage fluid is recirculated in the lubrication circuit and therefore not lost. So the amount of lubrication fluid in the circuit remains constant over a long time. Maintenance can be reduced regarding any refill of lubrication fluid or the like.

Embodiments of the invention further comprise a main bearing for a wind turbine according to the above detailed disclosure, comprising an inner ring and an outer ring, wherein the main bearing is a slide bearing and the inner ring is adapted to be stationary when mounted, while the outer ring is adapted to rotate around the inner ring when mounted, with the main bearing being lubricated with a lubrication fluid, and with the outer ring comprising a first and a second sealing means arranged at both sides of the outer ring for sealing to the inner ring and extending around the outer ring, wherein an associated stationary leakage lubrication fluid collection means is provided to be arranged adjacent to the first sealing means, which leakage lubrication collection means is adapted to collect lubrication fluid leaking from the first and the second sealing means, wherein the outer ring is provided with one or more axial bores connecting a leakage lubrication fluid collection area adjacent to the second sealing means to the leakage lubrication fluid collection means and wherein each sealing means comprises a groove accommodating a sealing element and a sealing element carrier ring having a fold and a clamp ring attached to the carrier ring closing the fold to build the groove and clamping the sealing means in the groove.

All features disclosed in regard of the inventive wind turbine, which are directly or indirectly related to the main bearing, the main bearing setup, a main bearing part or the like are also relevant for the disclosure of the inventive main bearing itself, so that any of these features may also be included for the main bearing, as all these features have also inventive relevance.

BRIEF DESCRIPTION

Some of the embodiments will be described in detail, with reference to the following figures, wherein like designations denote like members, wherein.

DETAILED DESCRIPTION

Figure 1:
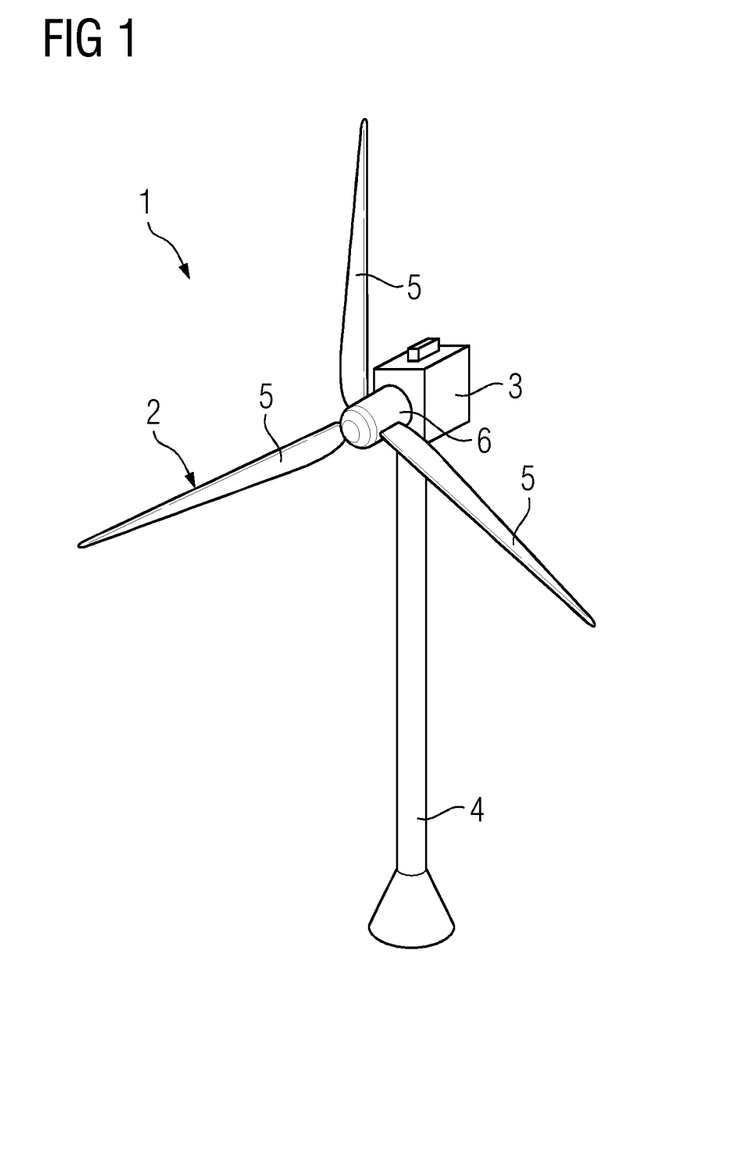
FIG. 1 shows a principal perspective sketch of a wind turbine.

FIG. 1 shows an inventive wind turbine 1, comprising a rotor 2 rotatably arranged at a nacelle 3, which is arranged on the top of a tower 4. The rotor 2 comprises three rotor blades 5 attached to a hub 6 as is commonly known. The rotor blades 5 interact with the wind making the rotor rotate. The rotor drives an electric generator, for example, a direct drive generator.

Figure 2:
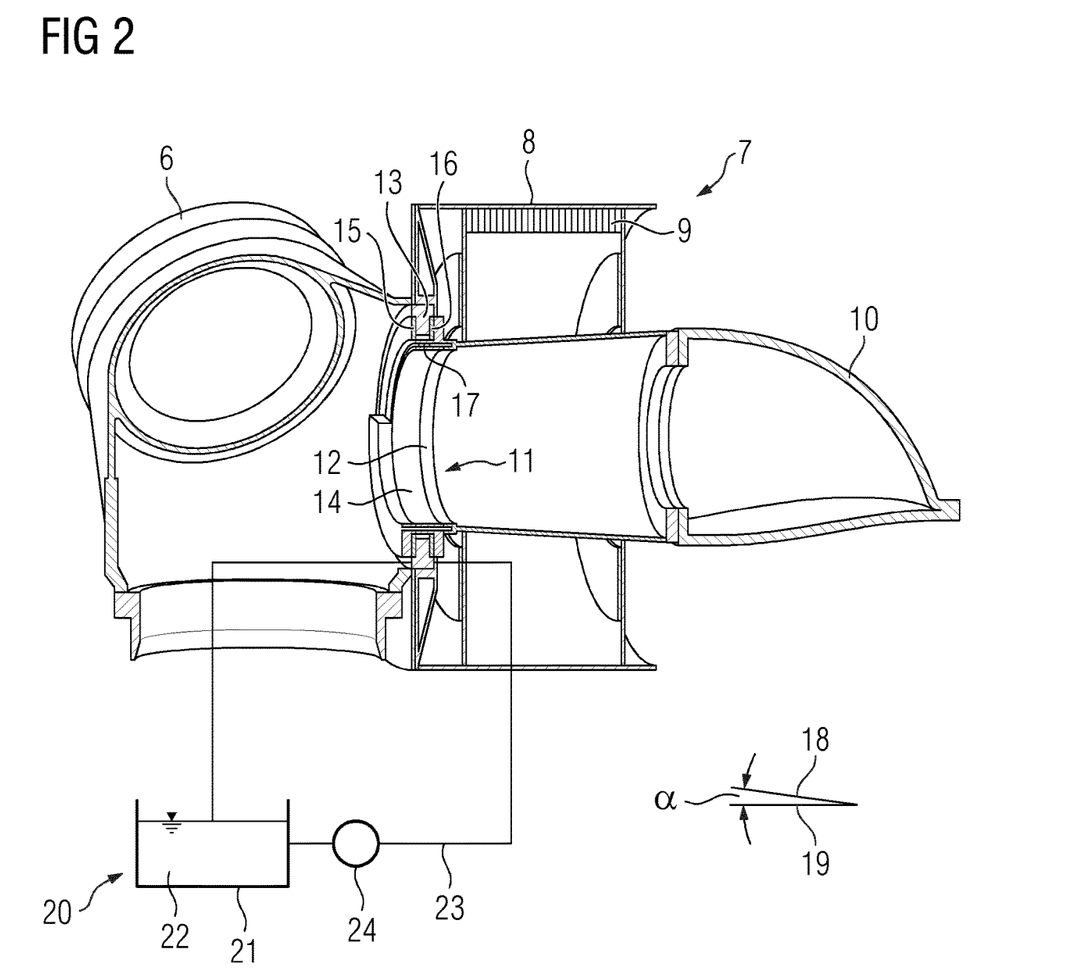
FIG. 2 shows a principle sketch of the arrangement of a hub, a rotor, and a main bearing according to an embodiment.

FIG. 2 shows an arrangement with the central elements of the wind turbine 1. It shows the hub 6 which is connected to a direct drive generator 7 comprising a rotor 8, which here is directly coupled to the hub 6, and further a stator 9. The stator 9 is stationary fixed to a main shaft 10.

The arrangement of hub 6 and rotor 8 is rotatable relative to the stationary shaft 10 respectively the stator 9. For bearing the hub-rotor-arrangement a main bearing 11 is provided, which in the shown embodiment is a slide bearing 12 comprising an outer ring 13, to which the hub-rotor-arrangement with the hub 6 and the rotor 8 is connected, so that, when the hub 6 rotates, also the outer ring 13 and the rotor 8 rotate. The main bearing 11 further comprises an inner ring 14 which is stationary and which is fixed to the main shaft 10.

As the main bearing 11 is a slide bearing 12 the rotating outer ring 13 is slidingly guided by axial and radial guiding or sliding pads or alternatively by tapered guiding or sliding pads in a tapered sliding bearing. FIG. 2 shows front axial pads 15 and rear axial pads 16 for axially guiding the outer ring 13 and radial pads 17 for radially guiding the outer ring 13. The pads 15, 16 and 17 are stationary fixed to the stationary inner ring 14. A sliding pad (15, 16, 17) may comprise several components (not shown) e.g. an outer sliding part, a support part for attachment to a structure by bolts or similar, a tilting support part to ensure that the sliding pad is able to tilt and/or a resilient means like e.g. a spring to ensure a preloading of the sliding pad and the tilting support.

The axis of rotation of the rotor 2 and therefore also the axis of rotation of the main bearing 11 is slightly tilted relative to the horizontal plane or axis. FIG. 2 shows the tilt angle α, which the axis of rotation 18 of the main bearing 11 shows relative to the horizontal plane or axis 19. Therefore the main bearing 11 is slightly tilted, which is advantageous for a simple leakage lubrication fluid collection system, which will be explained in detail below.

As mentioned, the main bearing 11 is a slide bearing. This slide bearing needs to be lubricated by a lubrication fluid, which provides an extremely thin hydrodynamic fluid film between the sliding surfaces of the outer ring, which rotates, and the axial and radial pads 15, 16 and 17. It is therefore necessary to constantly provide enough lubrication fluid in this area, which can either be flooded or directly introduced respectively lubricated to respective bearing point or evacuated bearing cavities etc. The lubrication system needs to maintain a permanent and constant lubrication amount in this area.

For providing a constant lubrication, an automatic lubrication arrangement 20 is provided, which is shown in principle in FIG. 2. This lubrication arrangement comprises a reservoir 21 with the lubrication fluid 22, which is integrated in a lubrication circuit 23. The lubrication fluid 22 circulates in the circuit 23 with a pump 24 integrated in the circuit 23. The circuit 23 comprises one or more fluid pipes, which or at least some of which are guided to the main bearing 11 to emit the lubrication fluid 22 at one or several points to the main bearing 11 or to completely flood it. As FIG. 2 further shows, the lubrication arrangement 20 further comprises in the circuit 23 a redirection pipe which allows for redirecting any collected leakage lubrication fluid which leaks from the main bearing 11 and which is redirected in the circuit 23, which collection system is explained below.

Figure 3:
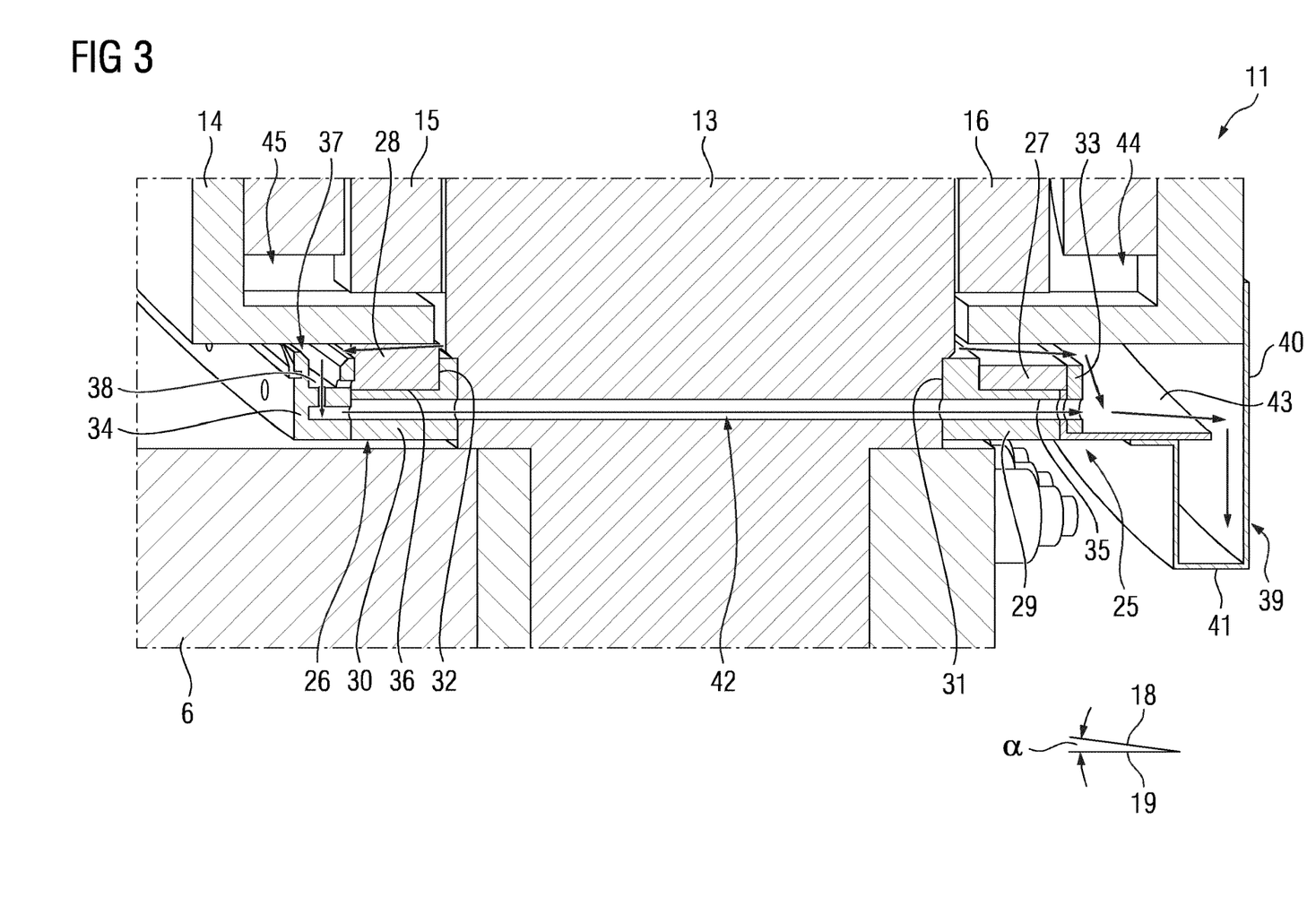
FIG. 3 shows an enlarged sectional view of the main bearing according to an embodiment.

FIG. 3 shows an enlarged partial view of the main bearing 11 respectively the slide bearing 12. The figure shows partly the outer ring 13 and the inner ring 14, and also the hub 6 which is in this embodiment attached to the outer ring 13. FIG. 3 shows a cross sectional view of the lower end of the main bearing 11.

The outer ring 13 is provided with a first sealing means 25 attached to the one respectively inner side of the outer ring 13 and with a second sealing means 26 attached to the other side of the outer ring 13. Each sealing means 25, 26 comprises a sealing element 27, 28, which slidingly contacts the adjacent stationary surface of the inner ring 14. Each sealing element 27, 28 may comprises lips slidingly contacting the inner ring surface, which lips respectively detailed setup is not shown in the figure.

Each sealing means 25, 26 further comprises a sealing element carrier 29, 30 having a fold 31, 32. Furthermore each sealing means 25, 26 comprises a clamp ring 33, 34 attached to the element carrier 29, 30, which closes the fold 31 for building a respective groove 35, 36, in which the sealing element 27, 28 is arranged respectively clamped.

Both sealing means 25, 26 provide a good and tight sealing, nevertheless some leakage of the lubrication fluid 22 may occur. As mentioned this leakage lubrication fluid is collected and redirected to the lubrication circuit 23.

For collecting the leakage fluid leaking from the second sealing means 26 a leakage lubrication fluid collection area 37, which is realised as a circular groove 38 is realised in the clamp ring 34. This groove 38 is as close as possible to the sealing element 32, so that any lubrication fluid leaking from this sealing element 32 is collected in the groove 38.

This leakage lubrication fluid collection area 37 is connected to a leakage lubrication fluid collection means 39 realised as a collector ring 40 extending around the main bearing. This lubrication collecting means 39 respectively the collector ring 40 is stationary attached for example, to the inner ring 14 in embodiments, so that it is close to the first sealing means 25.

The collector ring 40 comprises a collection groove 41, where any leaking lubrication fluid is collected, which collection groove 41 is connected to the lubrication circuit 23 for redirecting the collected leakage fluid.

For transferring leakage fluid collected in the groove 38 several axial bores 42 are provided, which connect the leakage lubrication fluid collection area 37 to the leakage lubrication fluid collection means 39, therefore it connects the groove 38 to the collector ring 40. A number of parallel axial bores 42 are provided and distributed equally around the circumference of the outer ring 13. Each axial bore 42 is open to the groove 38 at the one end and open to the collector ring 40 at the other end. It comprises several bore sections, as each axial bore 42 extends through the clamp ring 34, the sealing element carrier 30, the outer ring 13, the sealing element carrier 29 and the clamp ring 33 as FIG. 3 clearly shows. All respective bore sections are in alignment, so that a fluid channel is built.

As the main bearing 11 is slightly tilted towards the horizontal axis as shown by the axis of rotation 18 and the horizontal axis 19 and the tilt angle $\alpha$ in FIG. 3, and as therefore the right side of the main bearing with the first sealing means 25 is, due to the tilt, somehow lower than the other side with the second sealing means 26, each axial bore 42 is also slightly tilted with a tilt angle $\alpha$ towards the horizontal axis, so that a natural flow direction is realised and the lubrication fluid flows automatically from the groove 38 to the collector ring 40.

When exiting the respective axial bore 42 the lubrication fluid flows on a drip edge ring 43 fixed to the first sealing means 25, which drip edge ring 43 collects the fluid exiting the axial bore 42 and guides it to the collector ring 40. It axially extends into the collector ring 40 as FIG. 3 clearly shows.

Not only the lubrication fluid leaking the second sealing means 26 is collected on the drip edge ring 43 and the carrier ring 40, but also the lubrication fluid leaking from the first sealing means 25. This leakage fluid directly flows on the drip edge ring 43 and from there directly to the collector ring 40.

The respective leakage fluid flow is shown in FIG. 3 by the respective arrows.

The lubrication fluid is present in the inner of the main bearing 11, which is either flooded with the lubrication fluid respectively the oil, or the fluid is directly lubricated to certain points. The lubrication fluid is present in the areas 44, 45 of the main bearing 11, therefore on one side of each sealing means 25, 26, from where it leaks through the sealing means 25, 26 and is collected as explained above.

Figure 4:
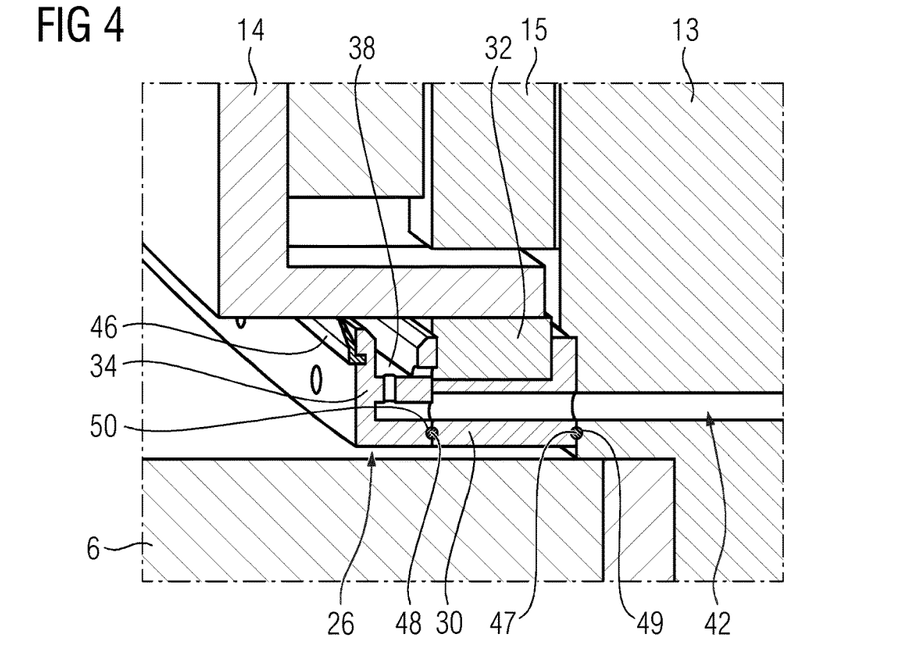
FIG. 4 shows an enlarged perspective view of a main bearing side with a second sealing means according to an embodiment.

FIG. 4 shows in an enlarged perspective view the second sealing means 26 with the sealing element carrier 30 and the clamp ring 34 with the groove 38. Attached to the clamp ring 34 is a sealing element 46 in form of a sealing lip which extends to the inner ring 14. This sealing element 46 provides a sealing on this side, so that any leakage lubrication fluid collected in the groove 38 remains in the groove 38 until it flows in the respective bore 42.

For fixing the element carrier 30 tightly to the inner ring 13 and for fixing the clamp ring 34 tightly to the element carrier 30, respective further sealing elements 47, 48 are arranged in respective grooves 49, 50 for example provided in the sealing element carrier 30 and the clamp ring 34 for example. This allows for an axial sealing of this element connection.

Figure 5:
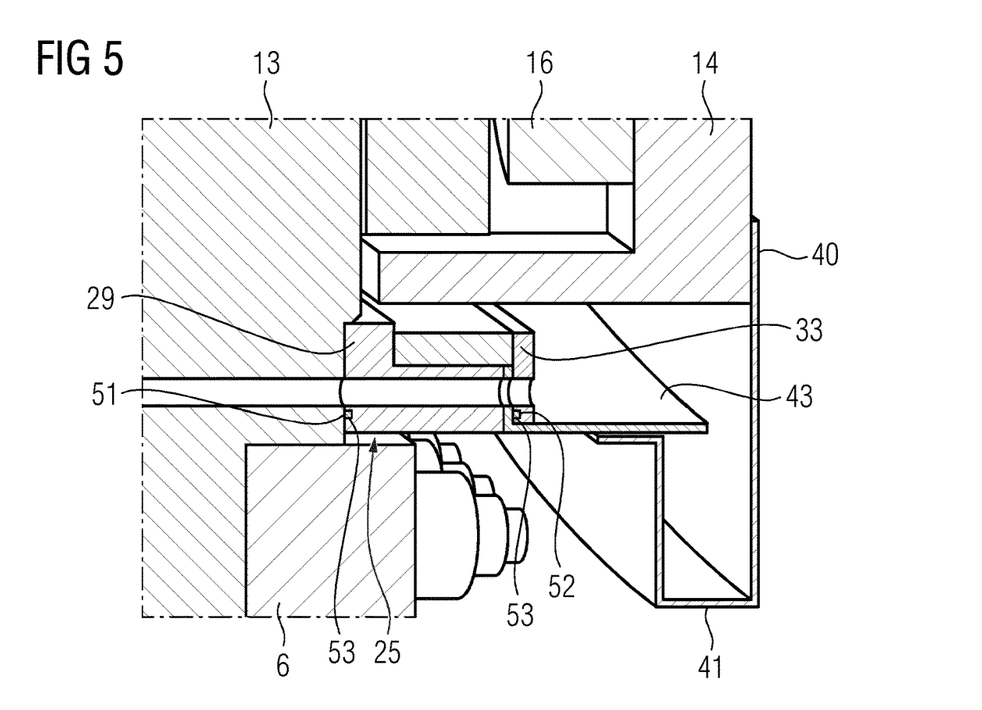
FIG. 5 shows an enlarged perspective view of the main bearing side with a first sealing means according to an embodiment.

An enlarged view of the other bearing side showing the first sealing means 25 is shown in FIG. 5. Also here respective sealing elements 51, 52 are arranged in respective grooves 53, 54, for example again provided in the surfaces of the sealing element carrier 29 and the clamp ring 33 in embodiments.

FIG. 5 shows furthermore the attachment of the collector ring 40 to the stationary inner ring 14 and the overlap of the drip edge ring 43 over or into the collector ring 40 respectively the collection groove 41, so that any leakage oil dripping from the drip edge of the drip edge ring 40 directly drips into this collection groove 41.

Figure 6:
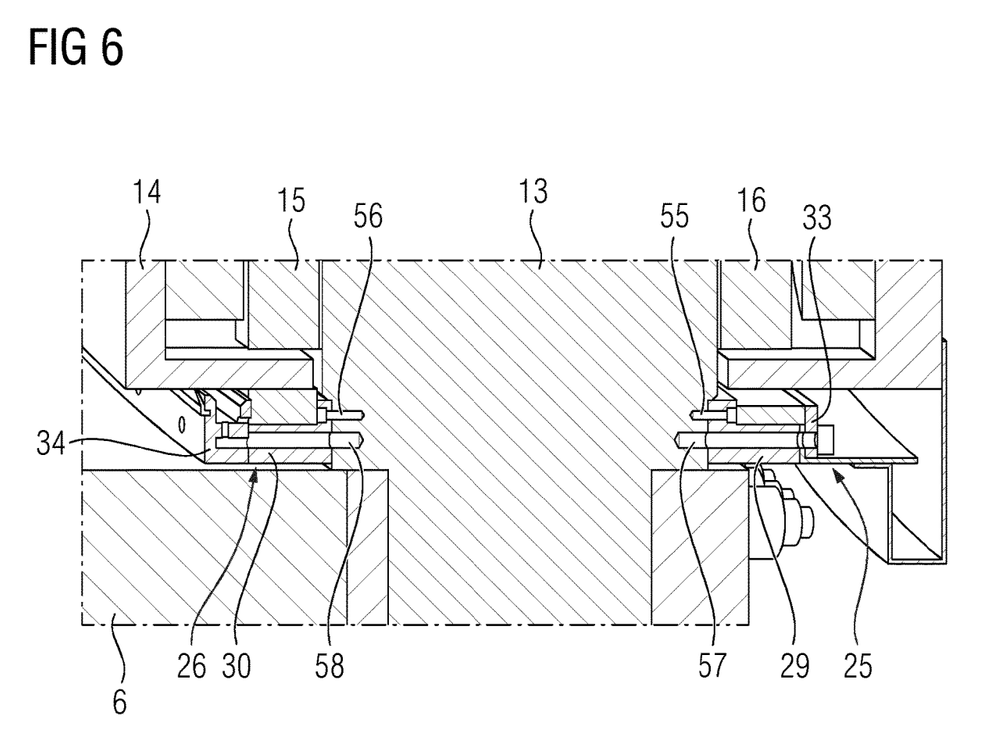
FIG. 6 shows a cross sectional view of the main bearing, in part, showing the fixation of the first and second sealing means to an outer ring according to an embodiment.

FIG. 6 shows a cross section view showing the fixation of the first and second sealing means 25, 26 to the outer ring 13. Each sealing element carrier 29, 30 is connected with first bolt connections 55, 56 to the outer ring 13. The outer ring 13 is provided with respective threaded bores, into which the bolt connections 55, 56, which are accommodated in respective through bores of the sealing element carrier 29, 30, are screwed.

The clamp rings 33, 34 and in addition, as a second fixation means, also the whole sealing means 25, 26 is fixed by respective further bolt connections 57, 58, which engage a respective through bore in the clamp ring 33, 34 and the sealing element carrier 29, 30 and extends into respective threaded bores in the outer ring, as shown in FIG. 6.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising a nacelle with at least one main bearing tilted with a rotation axis towards a horizontal axis and comprising an inner ring and an outer ring, wherein the at least one main bearing is a slide bearing and the inner ring is stationary while the outer ring rotates around the inner ring, with the at least one main bearing being lubricated with a lubrication fluid, and with the outer ring comprising a first sealing means and a second sealing means arranged at both sides of the outer ring for sealing to the inner ring and extending around the outer ring, wherein the first sealing means is due to the tilt of the at least one main bearing lower than the second sealing means, wherein a stationary leakage lubrication fluid collection means is provided adjacent to the first sealing means adapted for collecting lubrication fluid leaking from the first sealing means and the second sealing means, wherein the outer ring is provided with one or more axial bores connecting a leakage lubrication fluid collection area adjacent to the second sealing means to the stationary leakage lubrication fluid collection means and wherein each sealing means comprises a groove accommodating a sealing element and a sealing element carrier ring having a fold and a clamp ring attached to the sealing element carrier ring closing the fold to build the groove and clamping the sealing means in the groove.

2. The wind turbine according to claim 1, wherein the leakage lubrication fluid collection area is a collection groove extending around the outer ring.

3. The wind turbine according to claim 1, wherein the stationary leakage lubrication fluid collection means is arranged at the inner ring.

4. The wind turbine according to claim 1, wherein the stationary leakage lubrication fluid collecting means is a collector ring extending around the at least one main bearing.

5. The wind turbine according to claim 1, wherein a drip edge ring is arranged at the outer ring extending to or into the stationary leakage lubrication fluid collection means.

6. The wind turbine according to claim 1, wherein the clamp ring of the second sealing means comprises the leakage lubrication fluid area.

7. The wind turbine according to claim 1, wherein the sealing element is arranged at the clamp ring sealing a collection groove to the inner ring.

8. The wind turbine according to claim 1, wherein the one or more axial bores communicate with the leakage lubrication fluid collection area, and extend from the clamp ring through the sealing element carrier ring of the second sealing means, the outer ring and through the sealing element carrier ring and the clamp ring of the first sealing means and is open to the stationary leakage lubrication fluid collection means.

9. The wind turbine according to claim 1, wherein the clamp ring and the sealing element carrier ring are fixed to the outer ring by means of several bolt connections.

10. The wind turbine according to claim 1, wherein at least one sealing ring is arranged each between the clamp ring and the sealing element carrier ring and the sealing element carrier ring and the outer ring, which sealing rings are arranged in respective grooves.

11. The wind turbine according to claim 1, wherein several bores of the one or more axial bores connecting the leakage lubrication fluid collection area with the stationary leakage lubrication fluid collection means are equally distributed around the circumference of the outer ring.

12. The wind turbine according to claim 1, further comprising an automatic lubrication arrangement with a lubrication circuit with a pump for circulating the lubrication fluid, to which lubrication circuit the stationary leakage lubrication fluid collection means is connected.

13. A main bearing for a wind turbine, comprising an inner ring and an outer ring, wherein the main bearing is a slide bearing and the inner ring is adapted to be stationary while the outer ring is adapted to rotate around the inner ring, with the main bearing being lubricated with a lubrication fluid, and with the outer ring comprising a first sealing means and a second sealing means arranged at both sides of the outer ring for sealing to the inner ring and extending around the outer ring, wherein an associated stationary leakage lubrication fluid collection means is provided to be arranged adjacent to the first sealing means, which associated stationary leakage lubrication fluid collecting means is adapted to collect lubrication fluid leaking from the first sealing means and the second sealing means, wherein the outer ring is provided with one or more axial bores connecting a leakage lubrication fluid collection area adjacent to the second sealing means to the associated stationary leakage lubrication fluid collection means and wherein each sealing means comprises a groove accommodating a sealing element and a sealing element carrier ring having a fold and a clamp ring attached to the sealing element carrier ring closing the fold to build the groove and clamping the sealing means in the groove.

* * * * *